Figure 1:
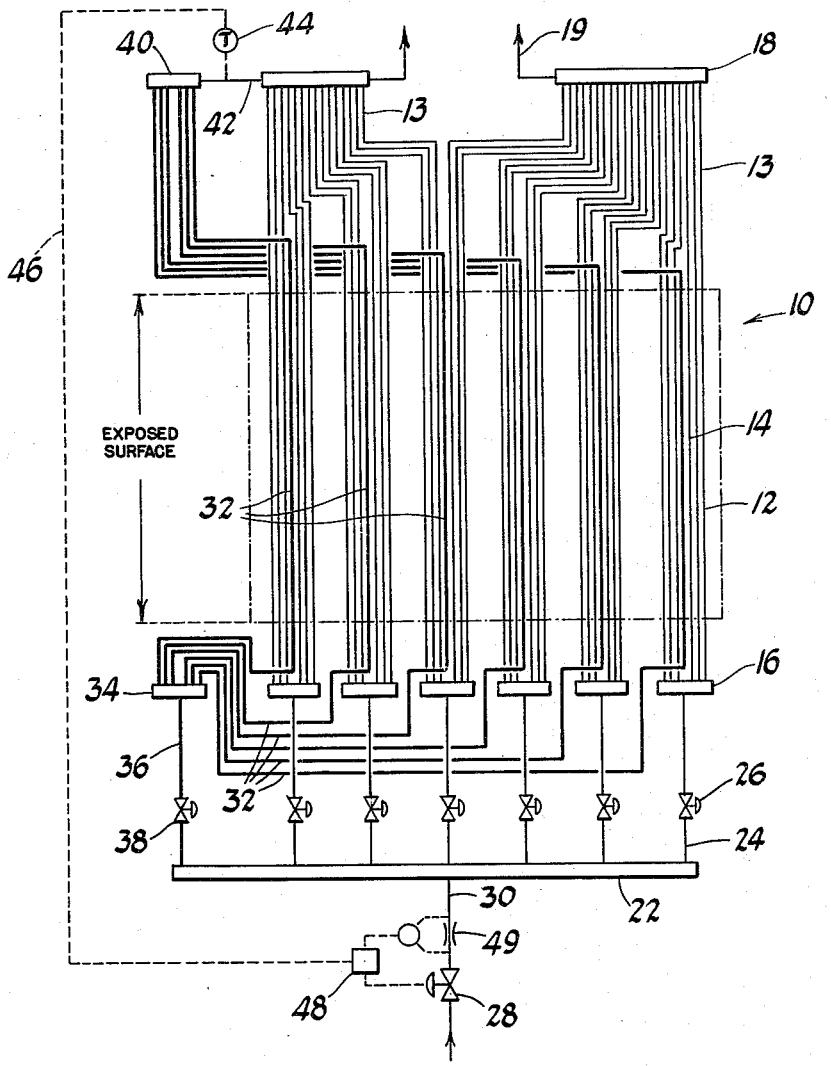

FIG. I

United States Patent Office 3,192,908
Patented July 6, 1965

3,192,908
METHOD AND APPARATUS FOR CONTROLLING THE TEMPERATURE OF VAPOR CREATED IN A VAPOR GENERATOR
Willburt W. Schroedter, West Hartford, Conn., assignor to Combustion Engineering, Inc., Windsor, Conn., a corporation of Delaware
Filed Nov. 15, 1962, Ser. No. 240,470
3 Claims. (Cl. 122—448)

The present invention relates to forced flow tubular vapor generators in which the heating surface is formed of a plurality of tubes through which a vaporizable medium flows. More particularly, the invention relates to a forced flow vapor generator wherein the tubes are arranged for parallel flow and wherein there is provided means for regulating the flow of working medium to the generator, said means being responsive to the temperature of the medium emerging from the vaporization portion of the generator.

The load demand upon a vapor generator is normally reflected upon the generator by changes in the temperature of the fluid which emerges from the evaporator, an increase in load manifesting itself as a lower temperature. In order to maintain a constant temperature of the vapor produced by the generator and to satisfy the load requirements of the unit, means must be provided to compensate for these changes in temperature. Such means normally take the form of a control apparatus which regulate the amount of heat absorption occurring within the evaporator in response to the temperature of the fluid leaving the evaporator. The regulating means may adjust the amount of heat emitted by the burners or may adjust the rate of flow of vaporizable fluid supplied to the generator and it is to this type of control means that the present invention is directed.

Heretofore, several embodiments of controls of the above-mentioned type have been utilized with limited degrees of success. One such embodiment provides for adjusting the feedwater supply to a control tube associated with each tube cluster such that superheated vapor emerges from its outlet end while the fluid flowing through the remainder of the tube cluster is heated to a point within the saturation range. By measuring the amount of superheat in the vapor emerging from the control tube an indication of the amount of heat absorbed by the remaining tubes is obtained. Feedwater is then admitted to each tube cluster or fuel is admitted to the burners in accordance with the amount of superheat measured in the control tubes so that regulation of the heat absorption rate in the generator can be maintained. This embodiment also provides for the regulation of heat absorption by the temperature of any of the other tubes should, during the course of abnormal operation of the unit, one of the other tubes become overheated and exceed that of the tube containing the adjusted flow. Such a control system naturally requires the incorporation of a temperature sensing device on all of the tubes in the system and, when applied to large vapor generators becomes cumbersome, uneconomical and impractical due to the large number of tubes present and the equally large number of sensing devices that are necessary.

Another embodiment of this type of control has somewhat reduced the detrimental features of its forerunner. In this system the body of tubes which forms the evaporator is divided into a number of subcircuits each comprising a header and a number of heat exchanger tubes. The subcircuits receive fluid from a main header which is united to the subcircuit header by means of a line having a throttling valve positioned therein. By adjusting the throttling valves the amount of vapor generation taking place in the subcircuits can be maintained substantially uniform. Accompanying each subcircuit through the furnace is a control tube which is in fluid communication with the main header and which has a throttling valve located at its inlet. Each control tube is associated with its respective subcircuit such that the control tubes and the tubes forming the subcircuit traverse the furnace in parallel relation with one another. The control tube throttling valve is adjusted so that the fluid flowing through the tube has an amount of superheat imparted to it such that a temperature which is representative of the amount of heat absorbed by the subcircuit is discernable. A temperature sensing device is applied at the outlet end of each control tube and flow regulating means responsive to the temperature sensing means are associated with the fluid supply source to the main header or to the fuel supply to the burners so as to permit regulation of the vapor being produced by the generator. The flow regulating means is such as will be operated in response to the highest temperature sensed within the entire system and regulation of heat absorption is based upon this temperature.

While this embodiment does overcome some of the deficiencies of the aforementioned embodiment, it nonetheless is subject to a number of disadvantages. Firstly, the throttling valve for each control tube must regulate very small amounts of fluid flow since the flow therethrough is only a fractional part of the fluid circulated through each subcircuit. The halves, therefore, must be highly accurate in order to adequately maintain their function of control. This means that such valves have a high initial cost and that great care must be taken in the way of maintenance to prevent a reduction in accuracy because of wear or the effects of deposits. The overall expense involved with the use of such valves is therefore high. Secondly, the system requires a larger number of valves, one being required for each subcircuit as well as one for each control circuit. This fact magnifies the expense of the control system. Thirdly, experience has shown that a single control tube may be subject to large heat variations, such as during soot blowing of the furnace walls, therefore to equalize the influence of such variations, it is customary to have the flow through the control tube in a condition of superheat at the outlet thereby requiring the use of a flow regulating device which permits the control tube exhibiting the highest measured temperature to control the feedwater flow for the entire system.

It is an object of the present invention to provide a control system for large forced flow vapor generators which avoids the above-mentioned disadvantages. According to the inventive concept, the heating surface of the generator is divided into a number of subcircuits with each subcircuit having an accompanying control tube located therewithin in a position such that it will receive a heat absorption that is representative of the heat absorption of the subcircuit. The control tubes all emanate from a single control header which is of a similar size as the headers of each subcircuit, and the flow from the main header thereto is throttled by a single throttling valve which is the same size or of a comparable size to the throttling valves associated with the subheaders. Each control tube follows a path through the subcircuit parallel to the tubes of the subcircuit with which it is associated and is again united with the other control tubes by means of an outlet header which is followed by a mixing link leading to the separator. In the mixing link the vapor conducted by all of the control tubes is combined. The temperature sensing means which controls a regulating device operable with either a feedwater valve or fuel valve is located at this point and thus senses a mean temperature for all of the control tubes. The flow regulating means is thereby governed by changes in the mean temperature of the entire system and not merely by changes which are exhibited by a single control tube.

It is therefore an object of the present invention to provide a control system wherein only one throttling valve is required for all of the control tubes in the vapor generator system thereby reducing the number of valves necessary to regulate the vapor generator.

Another object is to provide a control system for a vapor generator wherein the throttling valve for the control tubes passes essentially the same flow as do the other valves incorporated in the system thereby permitting the use of a single type of valve which is relatively inexpensive in that the problem of controlling a very small flow rate is eliminated.

A still further object of the present invention is to provide a vapor generator control system wherein the control tubes are evenly distributed across the surface of the full waterwall panel of parallel tubes so that the mean temperature of all of such tubes reflects a reliable indication of the heat absorption of the entire system thereby rendering the control system less subject to occasional upsets by changes in absorption of just part of the system.

An additional object of the present invention is to provide a vapor generator control system which requires only a single temperature sensing device thereby obviating the need of a complex flow regulating device which will be responsive to the highest temperature sensed by a number of sensing devices.

Figure 2:
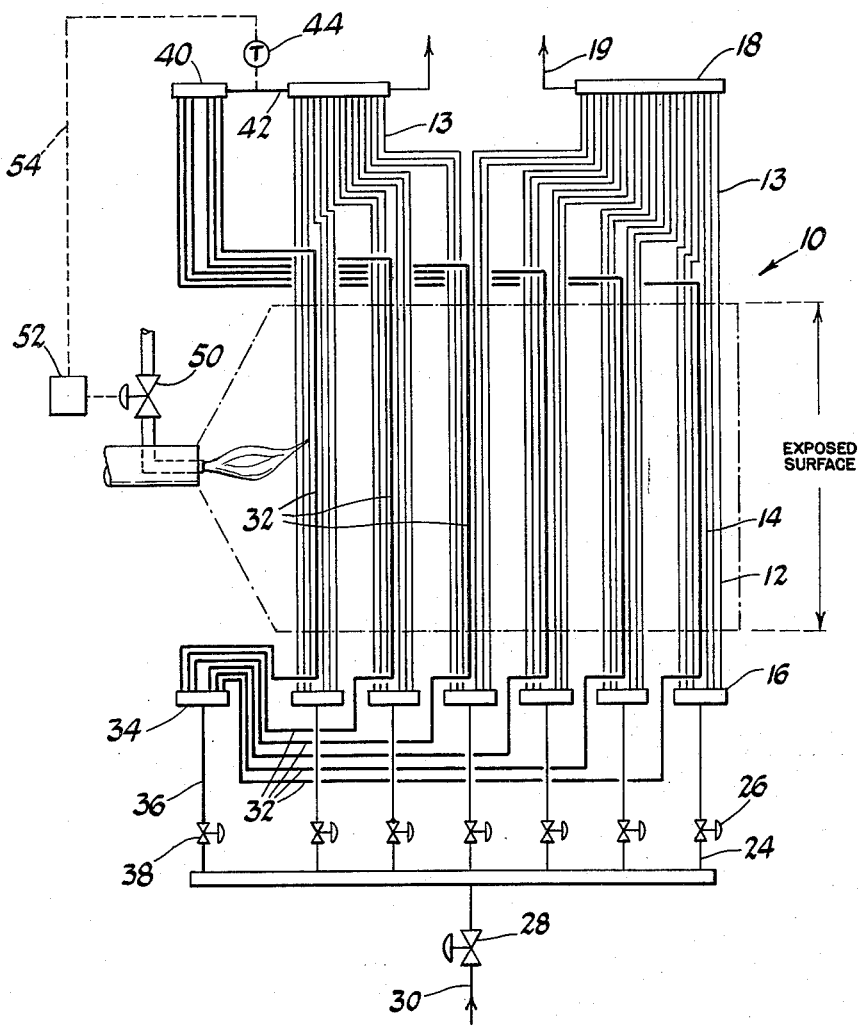

Other objects and advantages of the present invention will become apparent from the following description of an illustrative embodiment of the invention when read in conjunction with the accompanying drawings wherein:

FIGURE 1 is a diagrammatic representation of a portion of the tubular heating surface of a forced flow steam generator showing the control means utilized in regulating the feedwater supply in accordance with the present invention; and FIGURE 2 is a diagrammatic representation of a heating surface similar to that shown in FIGURE 1 wherein the control means regulates the burner fuel supply.

FIGURE 1 diagrammatically illustrates a typical heating surface 10 of a vapor generator. As shown, the heating surface 10 comprises a plurality of parallelly arranged heat exchanger tubes 12 which receive a vaporizable fluid in the form of feedwater from a source (not shown) and in which said fluid is transformed into vapor by the absorption of heat generated within the furnace of the vapor generator. The tubes 12 are arranged so as to form panels 13, and each panel is divided into a plurality of subcircuits 14, each subcircuit containing a limited number of tubes. The tubes 12 of each subcircuit 14 are connected at the lower end by means of a subcircuit inlet header 16 and at the upper end by outlet headers 18 which receive the mixture generated in the tubes. While a number of subcircuits 14 are shown as being connected with each outlet header 18, it is to be understood that each subcircuit could have its own individual outlet header without departing from the spirit of the invention. Communicating with the outlet headers 18 are lines 19 which conduct the mixture from the outlet header 18 to a separator or to other apparatus.

Vaporizable fluid is supplied to the subcircuit inlet headers 16 from the main header 22 which, in turn, receives its supply from a feedwater source (not shown) through a line 30. Conduits 24 effect fluid communication between the main header 22 and the subcircuit inlet headers 16. Interposed between the main header 22 and the subcircuit inlet headers 16 in the conduits 24 are throttling valves 26 whose purpose it is to regulate the flow of feedwater through the subcircuits such that the heat absorption in all subcircuits will be substantially uniform. In the line 30 which connects the main header 22 to the feedwater source, is positioned an adjustable feedwater valve 28 which regulates the amount of water supplied to the entire heating surface 10.

According to the present invention, a plurality of control tubes 32 are provided in the heating surface to give an indication of the amount of heat absorption taking place in each of the subcircuits 14. As shown in the figure, a control tube 32 accompanies the tubes 12 of each subcircuit 14 through the furnace where it is subjected to the same amount of heat as are the tubes of the subcircuits. The control tubes 32 for the portion of the heating surface 10 shown in FIGURE 1 emanate from a single inlet header 34 which is of a size comparable to the size of the subcircuit inlet headers 16. This sizing is permitted since the number of control tubes emanating from the header 34 is maintained equal or substantially equal to the number of tubes 12 which emanate from the subcircuit inlet headers 16 in each subcircuit 14. At their upper end, the control tubes 32 are connected by means of an outlet header 40 from which extends a conduit 42 through which the fluid emerging from the header 40 is conducted to the subcircuit outlet headers 18 where it mixes with the fluid emerging from these headers to pass on to the apparatus intended to receive it.

Line 36 connects the control inlet header 34 to the main header 22. In this line is positioned a throttling valve 38 similar to the valves 26 in lines 24. This valve regulates the amount of fluid supplied to the header 34 such that the heat absorbed by the control tubes 32 will be sufficient to impart a degree of superheat to the fluid. Superheating of the fluid passing through the control tubes is necessary so that a change in heat absorption within the control tubes 32 will result in a change in temperature in the fluid flowing through the control tubes, such not being permitted were the fluid to exist in a state of saturation. Communicating with the conduit 42 is a temperature sensing device 44 which gives an indication of the temperature of the fluid flowing therethrough. Since this fluid is a mixture of the vapor generated in all of the control tubes 32, the temperature which the device 44 will sense will be a mean of the temperatures of the fluid emerging from each of the control tubes.

The sensing means 44 is connected to an operator 48 for the feedwater valve 28 as by a line 46 whereby regulation of the feedwater admitted to the heating surface is controlled in response to the temperature sensed by the sensing element 44. This operator can be any device which is capable of regulating the valve 28 in response to an impulse received from the sensing element 44.

FIGURE 2 shows an arrangement of heating surface of a vapor generator which is similar to that shown in FIGURE 1. In this embodiment, however, the temperature sensing element 44 does not serve to operate a feedwater regulating valve such as is shown at 28 in FIGURE 1 but instead serves to control a fuel valve 50 by means of an operator 52 through the line 54. By means of this arrangement, control of the heat absorption of the heating surface 10 is effected by a regulation of the fuel supply to the burners 56 thereby to control the temperature of the combustion gases acting upon the heating surface. In the FIGURE 2 embodiment adjustment of the fuel valve is accomplished by varying the impulse in the impulse transmitting line 54 thereby controlling the regulator 52 which, in turn, opens and closes the fuel valve 50 in response to the sensing impulse.

In operation the burners of the vapor generator are fired and feedwater flow is begun through the tubes 12 of the subcircuits 14. At this point the heat absorption of each of the subcircuits 14 is checked by means of thermocouples (not shown), and the throttling valves 26 are adjusted so that the heat absorption in each subcircuit 14 will be substantially the same as that in the other subcircuits. Similarly, control throttling valve 38 is adjusted so that the fluid emerging from the control tubes 32 into the outlet header 40 will contain a degree of superheat such that changes in heat absorption in the subcircuits 14 will be reflected as changes in temperature in the control tubes 32.

Assuming now that superheated vapor exists at the outlet of the control tubes 32 and a change in the amount of heat absorbed by one or more of the subcircuits occurs, this change will be reflected to the control tube 32 as a change in the degree of superheat that originally existed and will be sensed by the sensing element 44 which, in turn, will send an impulse through the line 46. The impulse will act on the regulator 48 to open or close the feedwater valve 28 of the FIGURE 1 embodiment to alter the amount of feedwater supplied to the heating surface or the fuel valve 50 of the FIGURE 2 embodiment to alter the amount of heat generated by the burners so as to adjust the amount of heat absorbed by the fluid flowing through the subcircuits to bring the rate of heat absorption back to the norm which was determined by the original setting of the throttling valves 26 and thereby maintain a substantially constant temperature for the vapor generated in the generator.

While the embodiments of the invention shown and described herein have been directed toward a vapor generator operating at subcritical temperatures and pressures, it is to be understood that the present system is equally applicable to vapor generators operating within the supercritical range. A vapor generator operated at supercritical conditions would incorporate a system that is identical to those shown in FIGURES 1 and 2 with the exception, of course, that there would be no separator 20 since all of the fluid emerging from the heating surface 10 would be superheated vapor.

The preferred embodiments of the invention have also been described in connection with tubes arranged in subcircuits with the temperature sensing element 44 operating within a line that contains superheated vapor. However, there is one other zone of variable temperature of the vaporizable fluid within a vapor generator within which the temperature sensing element would be effective. This is the heating zone immediately preceding the zone within which evaporation of the vaporizable fluid occurs. In this zone, as in the superheating zone, the temperature of a given quantity of vaporizable fluid reflects the amount of the heat absorbed by that fluid. It is therefore to be understood that the present invention could be modified such that the temperature sensing element 44 senses the fluid within this zone wherein the temperature variations will be utilized to regulate the supply of feedwater or the supply of fuel in a manner similar to that which was earlier described in connection with temperature variations in the superheated vapor zone.

From the foregoing description it can be seen that the present invention provides a simple, yet highly reliable, control system for regulating the operation of a vapor generator. The arrangement of elements is such as to permit the utilization of inexpensive components to obtain accurate regulation thereby rendering the system both efficient and economical.

The description set forth herein is intended to be merely illustrative of the invention and is not intended as a limitation thereto, it being understood that many and varied modifications can be made to the disclosed arrangement of elements without departing from the spirit of the appended claims.

What is claimed is:

1. In a vapor generator in which heat is exchanged between a liquid working medium and a gaseous working medium and having the heating surface thereof comprised of tubes conducting said liquid medium and being exposed to said gaseous medium, said tubes being connected in parallel and divided into sub-circuits, the combination of means for regulating the rate of supply of at least one of said mediums to said vapor generator, a control tube conducting liquid working medium associated with each sub-circuit, inlet and outlet header means common to said control tubes to the exclusion of said sub-circuits connecting said control tubes in parallel, a variable flow restricting device common to all of said control tubes and associated with said inlet header means, said flow restricting device having a restricting value to have superheated vapor received in said outlet header means, means associated with said outlet header means for sensing the temperature of superheated vapor, and means for operating said flow regulating means in response to the temperature sensed by said sensing means.

2. In a vapor generator in which heat is exchanged between a liquid working medium and a gaseous working medium and having the heating surface thereof comprised of tubes conducting said liquid medium and being exposed to said gaseous medium, said tubes being connected in parallel and divided into sub-circuits, the combination of means for regulating the rate of supply of at least one of said mediums to said vapor generator, a control tube conducting liquid working medium associated with each sub-circuit, inlet and outlet header means common to said control tubes to the exclusion of said sub-circuits connecting said control tubes in parallel, first variable flow restricting means associated with each of said sub-circuits having a restricting value to have saturated vapor issue from said sub-circuits, second variable flow restricting means common to all of said control tubes and associated with said inlet header means, said second flow restricting means having a restricting value to have superheated vapor received in said outlet header means, means associated with said outlet header means for sensing the temperature of the superheated vapor therein, and means for operating said flow regulating means in response to the temperature sensed by said sensing means.

3. In a vapor generator in which heat is exchanged between a liquid working medium and a gaseous working medium and having a fluid circuit comprised of tubes conducting said liquid medium and being exposed to said gaseous medium, first header means including inlet and outlet headers connecting said tubes in parallel and dividing said circuit into sub-circuits, the combination of means for regulating the rate of supply of at least one of said mediums to said vapor generator, control means associated with said fluid circuit including a control tube conducting liquid working medium associated with each sub-circuit, second header means including inlet and outlet headers connecting said control tubes in parallel independent of the tubes forming said sub-circuits, the inlet headers of said second header means connecting substantially the same number of tubes as the inlet headers of said first inlet means, a first variable flow restricting device associated with each of the inlet headers of said first header means having a flow restricting value to have saturated vapor issue from said sub-circuits, a second variable flow restricting device associated with the inlet header of said second header means having a flow restricting value to have superheated vapor received in the outlet header of the second header means, means associated with said outlet header of said second header means for sensing the temperature of the superheated vapor in said outlet header, and means for operating said flow regulating means in response to the temperature sensed by said sensing means.

References Cited by the Examiner

UNITED STATES PATENTS

| | | | |
|---|---|---|---|
| 1,928,010 | 9/33 | Egloff | 122—451.1 |
| 3,004,529 | 10/61 | Argersinger et al. | 122—451.1 |

FOREIGN PATENTS

| | | |
|---|---|---|
| 1,245,988 | 10/60 | France. |
| 7,776 | 8/56 | Germany. |
| 474,026 | 12/26 | Germany. |
| 485,716 | 11/29 | Germany. |

PERCY L. PATRICK, *Primary Examiner*.

FREDERICK L. MATTESON, JR., *Examiner*.